(12) United States Patent
Van Dijk et al.

(10) Patent No.: US 11,375,692 B2
(45) Date of Patent: Jul. 5, 2022

(54) TAG FOR ATTACHMENT TO AN ANIMAL

(71) Applicant: Nedap N.V., Groenlo (NL)

(72) Inventors: Jeroen Martin Van Dijk, Enschede (NL); Roxie Sabri Romero Muller, Enschede (NL)

(73) Assignee: NEDAP N.V., DC Groenlo (NL)

( * ) Notice: Subject to any disclaimer, the term of this patent is extended or adjusted under 35 U.S.C. 154(b) by 211 days.

(21) Appl. No.: 16/628,286

(22) PCT Filed: Jul. 5, 2018

(86) PCT No.: PCT/NL2018/050440
§ 371 (c)(1),
(2) Date: Jan. 3, 2020

(87) PCT Pub. No.: WO2019/009717
PCT Pub. Date: Jan. 10, 2019

(65) Prior Publication Data
US 2020/0214256 A1    Jul. 9, 2020

(30) Foreign Application Priority Data
Jul. 5, 2017  (NL) ...................................... 2019177

(51) Int. Cl.
*A01K 11/00* (2006.01)
*G06K 19/077* (2006.01)

(52) U.S. Cl.
CPC ............ *A01K 11/004* (2013.01); *A01K 11/00* (2013.01); *G06K 19/0776* (2013.01); *G06K 19/07758* (2013.01)

(58) Field of Classification Search
CPC .... A01K 11/00; A01K 11/001; A01K 11/002; A01K 11/004; A01K 11/006; A01K 11/008; H04Q 5/22
See application file for complete search history.

(56) References Cited

U.S. PATENT DOCUMENTS 5,241,923 A * 9/1993 Janning ................ A01K 11/006
119/721
5,588,234 A   12/1996 de Jong et al.
5,650,778 A * 7/1997 Urbas .................... H01Q 7/005
340/10.51

(Continued)

FOREIGN PATENT DOCUMENTS

DE     19822383     12/1998

OTHER PUBLICATIONS

Google_search (Nov. 11, 2021).*
International Search Report dated Oct. 9, 2018.

*Primary Examiner* — Van T Trieu
(74) *Attorney, Agent, or Firm* — Jacobson Holman PLLC

(57) ABSTRACT

A tag for attachment to an animal comprising: a transmitter unit for generating a transmitter signal; a first antenna unit connected with the transmitter unit, for emitting the transmitter signal; an energy source for providing electrical energy to at least the transmitter unit; and a housing in which the transmitter unit, antenna unit and the energy source are included, the housing being provided with an attachment opening for receiving therethrough an attachment element for attachment of the tag to the animal, characterized in that the first antenna unit is provided with at least one first winding which extends around the attachment opening.

19 Claims, 3 Drawing Sheets

(56) References Cited

U.S. PATENT DOCUMENTS

| | | | |
|---|---|---|---|
| 2010/0045468 A1 | 2/2010 | Geissler | |
| 2011/0248830 A1* | 10/2011 | Jeppesen | A01K 11/004 340/10.1 |
| 2017/0280688 A1* | 10/2017 | Deliou | G06K 7/10297 |

* cited by examiner

TAG FOR ATTACHMENT TO AN ANIMAL

SUMMARY OF THE INVENTION

The invention relates to a tag comprising:
a transmitter unit for generating a transmitter signal;
a first antenna unit connected with the transmitter unit, for emitting the transmitter signal;
an energy source for providing electrical energy to at least the transmitter unit; and a housing in which the transmitter unit, antenna unit and the energy source are included, the housing being provided with
an attachment opening for receiving therethrough an attachment element for attachment of the tag to the animal.

In particular, the invention relates to an active tag. The energy source then comprises, for example, a battery. It is also possible, however, that the energy source is a resonant circuit which is partly formed by the antenna unit, whereby the resonant circuit can draw energy from an electromagnetic interrogation field to which the tag reacts, for example, by emitting an identification code. In that case, the tag is a passive tag.

Tags are crucial for transmitting signals directly from an animal. This can be necessary for, for example, tracing an animal. In order to be attached to an animal, the housing is provided with the attachment opening. By such an attachment opening, an attachment element can be received therethrough. In some cases, the attachment element can be a band or strap to place the tag around the neck of an animal. Such tags are sometimes difficult to handle.

It is an object of the invention to provide a tag which can be made of compact construction without thereby diminishing the performances regarding emission of the transmitter signal. To this end, the first antenna unit is provided with at least one first winding which extends around the attachment opening, wherein the antenna unit is provided with a conductive wire which comprises the at least one first winding, wherein the conductive wire on one side comprises a connection side which is connected with the transmitter unit and on the other side comprises a free end. Thus, the first antenna unit is of a space-saving configuration. An advantage is that the housing can take a more manageable size. Optionally, the housing comprises a tube, open at both ends, which extends through the housing and defines the attachment opening. In particular, the tube is integral with at least an outer wall of the housing. An advantage is that via the attachment opening, elements in the housing are not accessible, and hence the elements in the housing are better protected in intercourse.

The conductive wire is preferably made from a metal or metal alloy, in particular copper or an alloy with copper.

Optionally, the at least one first winding comprises a multiplicity of first windings which in combination form a helix. The helix is thereby formed in its entirety around the attachment opening. The electromagnetic properties of such an antenna unit are very favorable while at the same time the helix does not take up much space so that the tag can still be made of compact construction.

Optionally, the at least one first winding of the first antenna unit is configured to form a magnetic axis which substantially corresponds to a length axis of the attachment element when the attachment element is received through the opening and/or to an axial length of the attachment opening. An advantage is that an attachment element can function as a removable core which cooperates with the antenna unit. The attachment element can then be, for example, of a conductive material such as iron or an iron alloy.

Optionally, an axial length of the helix formed by the first windings substantially corresponds to an axial length of the attachment opening and/or to a length axis of the attachment element when the attachment element is received through the opening. An advantage is that a core area of the antenna unit is accessible outside the housing without the antenna unit being outside the housing. This winding configuration in combination with position thereof is further space-saving. Further, the at least one first winding may be supported along its length by an inner side of the housing around the hole. This imparts additional sturdiness to the at least one first winding without additional materials being necessary for this.

Optionally, the attachment opening is provided outside a center of gravity of the tag. An advantage is that during use the tag can align under the influence of gravity, such that the transmitter unit is above the center of gravity.

Optionally, the housing comprises a disc-shaped body part, with the attachment opening provided outside a center of the disc-shaped body part, in particular outside the disc-shaped body part.

Optionally, the tag further comprises a processor for generating information with which the transmitter signal is modulated by the transmitter unit. The processor is included in the housing and in particular, in use, the energy source provides the processor with energy for the operation of the processor.

Optionally, an energy source comprises a battery or a resonant circuit. The resonant circuit can then be partly formed by a capacitance (such as a capacitor) and an inductor (such as a coil), whereby the resonant circuit, for example, is configured such that it can draw energy from an electromagnetic interrogation field to which the tag reacts. The antenna unit can optionally serve as an inductor. The energy source could also comprise a battery and a resonant circuit in combination, the resonant circuit, for example, being so configured that it can be used for charging the battery.

Optionally, the tag further comprises at least one sensor system which is connected with the processor for generating at least a part of the information with which the transmitter signal is modulated by the transmitter unit.

Optionally, the sensor system comprises at least one of a temperature sensor, heart rhythm sensor, biosensor, position determining sensor such as a GPS sensor and G sensor.

Optionally, the tag further comprises at least one receiver unit which is included in the housing and is connected with the first antenna unit, whereby in particular, in use, the energy source provides the receiver unit with energy for the operation of the receiver unit. Also, the tag may further comprise a second antenna unit to transmit or receive signals at different frequencies than the first antenna unit.

Optionally, a least diameter of the at least one winding of the first antenna unit is at most 3 times, preferably at most 2 times, more preferably at most 1.5 times, still more preferably at most 1.3 times the maximum diameter of the attachment opening.

Optionally, the tag further comprises the attachment element, the attachment element being provided with a pin which, in use, extends through the attachment opening, the pin comprising a rigid part which is made, for example, of metal and/or glass-filled plastic.

Optionally, the pin is in the form of an arrow-shaped rod, the arrow-shaped rod comprising an arrow head and an arrow body, the axial length of the arrow body being approximately equal to the axial length of the attachment opening.

Optionally, the attachment element comprises a base, with the pin extending from the base in a direction directed away from the base, while, in use, the base and an outer surface of the housing form opposite clamp surfaces for clamping therebetween a body part of the animal, such as an ear.

An advantage is that the tag can thus be simply and sturdily attached to the animal.

Optionally, the first antenna unit is configured to emit the transmitter signal at a frequency which is less than 2.5 GHz, preferably less than 2 GHz, more preferably less than 1 GHz, in particular 420-450 MHz, more particularly approximately 433 MHz. An advantage is that, as a consequence, the transmitter signal can propagate through the animal, in particular cows, substantially without absorption of the transmitter signal by the body of the animal.

Optionally, the first antenna unit is configured to irradiate at least one receiver with the transmitter signal for determining the position of the tag with the aid of the at least one receiver.

Optionally, the transmitter signal contains information about the identification of the tag (of the animal that wears the tag) and/or health information of the animal which has been determined, for example, by the tag. Health information can for instance comprise information about the heart rhythm, the temperature, and/or the movement behavior of the animal.

Optionally, the housing is made substantially of a plastic, preferably substantially of thermoplastic polyurethane (TPU). An advantage is that the tag is consequently resistant to ambient influences such as impact and temperature fluctuations.

DESCRIPTION OF THE DRAWINGS

The invention will be further clarified by the description of a few specific embodiments. For this purpose, use is made of references to the appended figures. The detailed description provides examples of possible application modes of the invention. These application modes should not be regarded as the only possible embodiments falling under the ambit of the invention. The scope of the invention is defined in the claims, and the description should be regarded as being illustrative without thereby limiting the invention.

DESCRIPTION OF THE INVENTION

Figure 1:
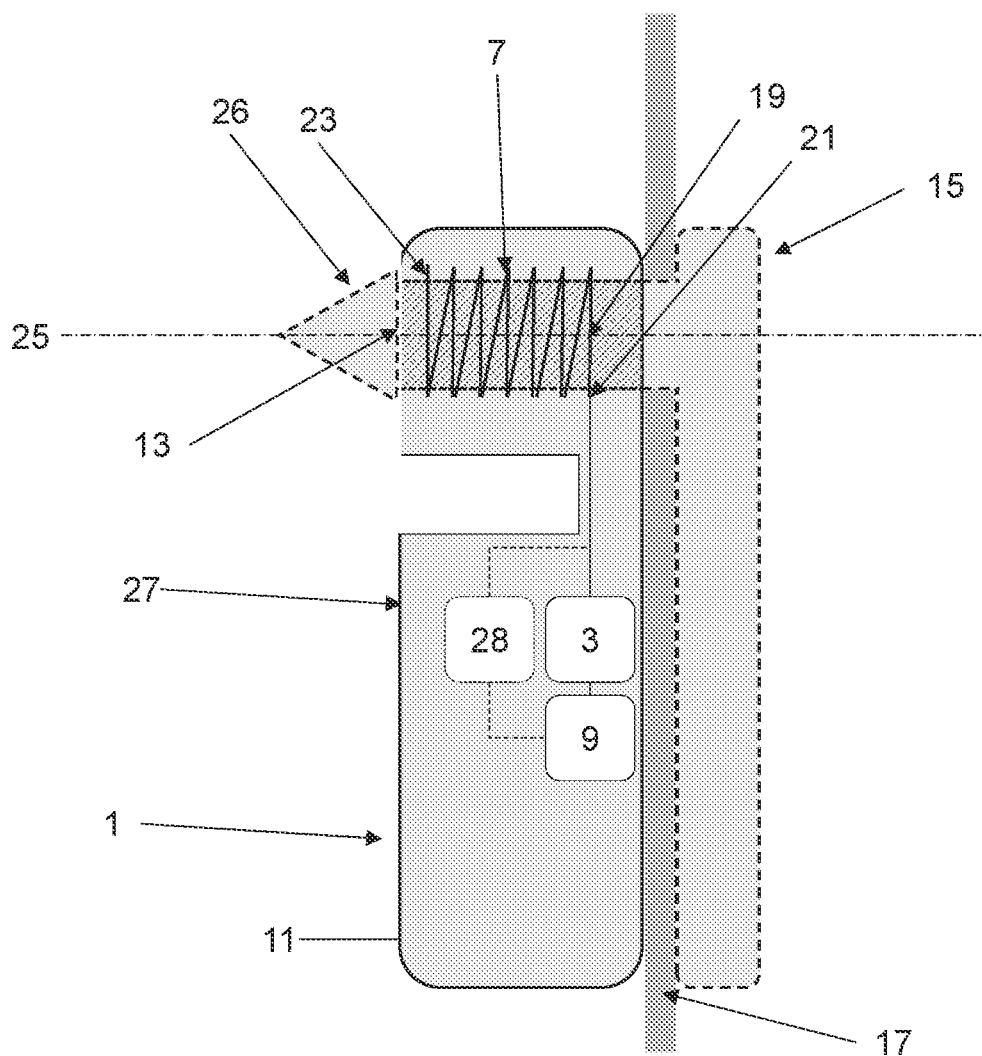
FIG. 1 shows schematically a tag according to the invention.

FIG. 1 shows a tag 1 for attachment to an animal. The tag 1 includes a transmitter unit 3 for generating a transmitter signal. The tag 1 further includes a first antenna unit 7, connected with the transmitter unit 3, for emitting the transmitter signal. The tag 1 further includes an energy source 9 for providing electrical energy to at least the transmitter unit 3. The tag 1 further comprises a housing 11 in which the transmitter unit 3, the antenna unit 7 and the energy source 9 are included. The energy source 9 can be a battery, such as a lithium ion battery. The energy source 9 may also be a resonant circuit which is partly formed by an inductor (such as a coil) and a capacitance (such as a capacitor), the resonant circuit being, for example, so configured that it can draw energy from an electromagnetic interrogation field to which the tag 1 reacts. The inductor can be, for example, the antenna unit 7. The housing 11 is provided with an attachment opening 13 for receiving therethrough a part of an attachment element 15 for attachment of the tag 1 to the animal. In this example the tag 1 is attached to an ear 17 of the animal. The first antenna unit 7 is provided with at least one first winding 19 which extends around the attachment opening 13. In FIG. 1, the at least one first winding 19 comprises a multiplicity of first windings which in combination form a helix. This, however, is not requisite. The antenna unit 7 is provided with a conductive wire for forming the at least one first winding 19. The antenna unit 7, in particular the conductive wire of the antenna unit 7, on one side comprises a connecting side 21 which is connected with the transmitter unit 3 and on the other side comprises a free end 23. The conductive wire can be, for example, of copper or another metal or an alloy. The attachment element 15 comprises a pin 26, which, in use, extends through the attachment opening 13, the pin 26 comprising a rigid part which is made, for example, of metal and/or glass-filled plastic. The pin 26 is in the form of an arrow-shaped rod, the arrow-shaped rod comprising an arrow head and an arrow body. The axial length of the arrow body is approximately equal to the axial length of the attachment opening 13. The axial length of the arrow body can be, for example, that of the axial attachment opening 13 plus a thickness of the ear 17 of a cow. In FIG. 1 an axial length, such as a length axis 25, of the helix formed by the first windings substantially corresponds to an axial length of the attachment opening 13 and/or to an axial axis of the pin 26 of the attachment element 15. This is not requisite, but preferential. The at least one first winding 19 of the first antenna unit 7 may be configured to form a magnetic axis which substantially corresponds to the length axis 25 of the pin 26 of the attachment element 15 when the pin 26 of the attachment element 15 is received by the opening 13. A least diameter of the at least one winding 19 of the first antenna unit 7 is at most 3 times, preferably at most 2 times, more preferably at most 1.5 times, still more preferably at most 1.3 times the maximum diameter of the attachment opening 13. The first antenna unit 7 may be configured to emit the transmitter signal at a frequency which is less than 2.5 GHz, preferably less than 2 GHz, more preferably less than 1 GHz, in particular 420-450 MHz, more particularly approximately 433 MHz. The first antenna unit 7 may be configured to irradiate at least one receiver (not shown, but conventional) with the transmitter signal for determining the position of the tag 1 with the aid of the at least one receiver. Optionally, the transmitter signal contains information about the identification of the tag 1. The information about this identification may for instance be stored in the transmitter unit 3 or elsewhere in the tag. The tag 1 in this example is further provided with the attachment element 15, but this is entirely optional and therefore represented in broken lines. The tag 1 may further be provided with at least one receiver unit 28, which is included in the housing 11 and is connected with the antenna unit 7, while in particular, in use, the energy source 9 provides the receiver unit 28 with energy for the operation of the receiver unit 28. The receiver unit 28, however, is entirely optional and is therefore represented in broken lines. The receiver unit 28 can be a radio receiver, such as a UHF receiver.

Figure 2:
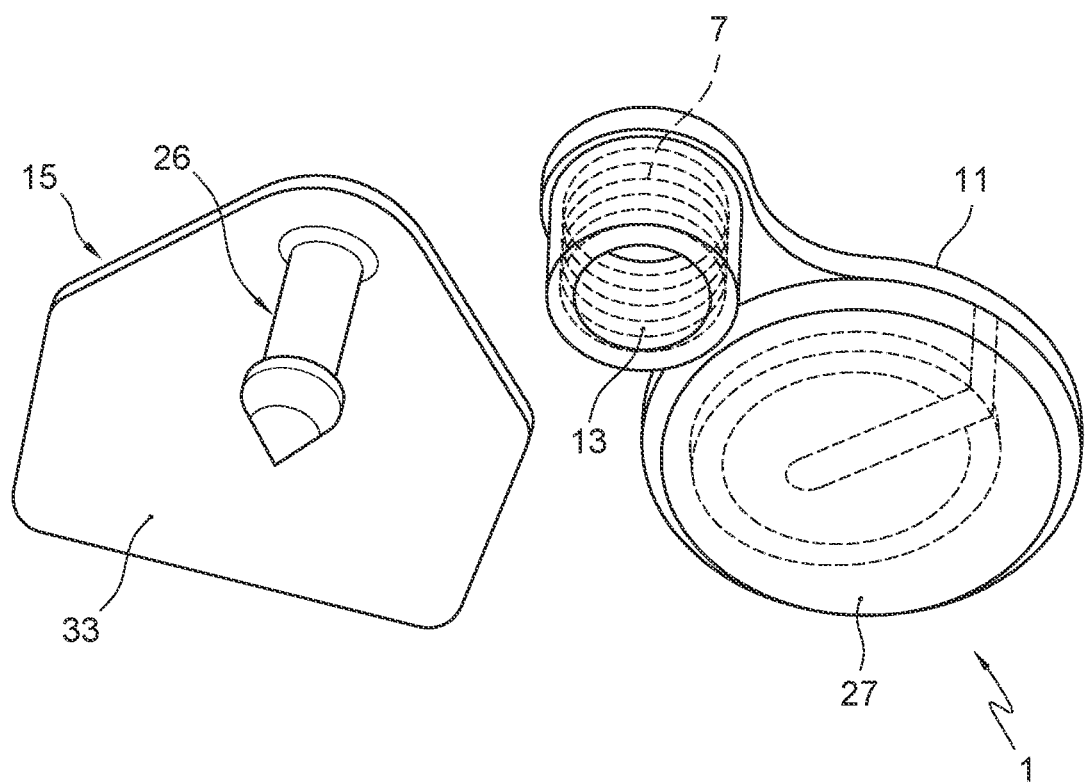
FIG. 2 shows a photograph of the tag of FIG. 1.

FIG. 2 shows a photo of tag 1 according to FIG. 1. The optional attachment element 15 is here represented separately from the housing 11. The attachment opening 13 in this example is provided outside a center of gravity of the housing 11, but this is entirely optional. The housing 11 can comprise a substantially disc-shaped body part 27 (visible in FIG. 2), with the attachment opening 13 provided outside a center of the disc-shaped body part 27, in particular outside the disc-shaped body part 27. The housing 11 is made substantially of a plastic, preferably substantially of thermoplastic polyurethane (TPU). The attachment element 15 further comprises a base 33, with the pin extending from the base in a direction directed away from the base.

Figure 3:
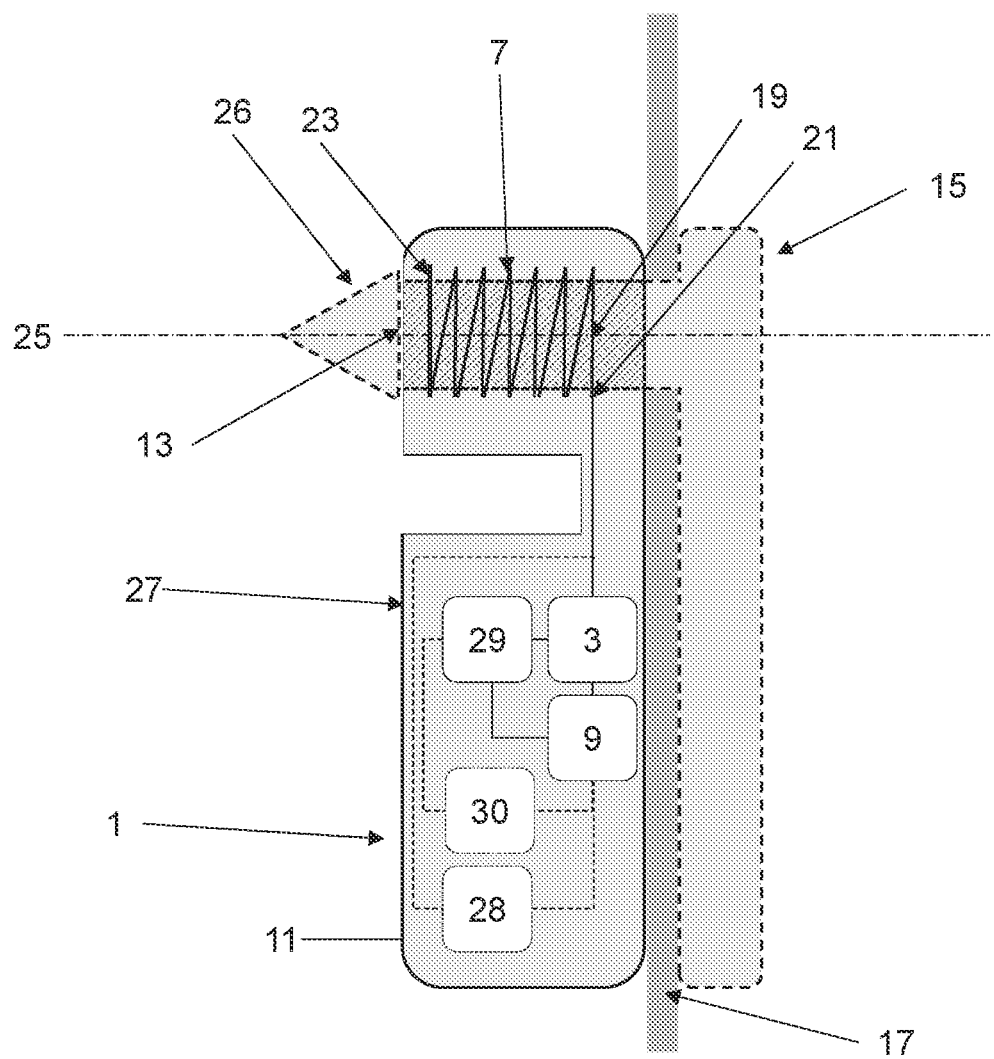
FIG. 3 shows schematically a further tag according to the invention.

FIG. 3 shows schematically a further tag 1'. In FIG. 1 and FIG. 3, mutually corresponding parts are provided with the same reference numerals. In the following, only the differences of the tag 1' of FIG. 3 with respect to the tag 1 of FIG. 1 will be discussed. The tag 1' includes a processor 29 for generating information with which the transmitter signal is modulated by the transmitter unit 3. This information can comprise inter alia an identity of the animal that is wearing the tag. The processor 29 is included in the housing 11, while in particular, in use, the energy source 9 provides the processor 29 with energy for the operation of the processor 29. Optionally, the tag 1' comprises at least one sensor system 30 which is connected with the processor 29 for generating at least a part of the information. The information comprises information which has been obtained with the aid of the sensor system 30. The sensor system 30 can comprise, for example, a G sensor for measuring movement of the tag 1' in three spatial dimensions, and/or a temperature sensor and/or a biosensor and/or a heart rhythm sensor. Other sensors are also possible. The sensor system 30 is entirely optional and is therefore represented in FIG. 3 in broken lines. The sensor system may be included in the housing 11, while in particular, in use, the energy source 9 provides the sensor system 30 with energy for the operation of the sensor system 30.

For the sake of clarity and conciseness of the description, features have been described here as part of the same or of separate embodiments. It will be clear to those skilled in the art that embodiments comprising combinations of any or all of the described features also fall within the scope of protection of the invention. Within the purview of those skilled in the art, modifications are possible which are considered to be within the scope of the protection. Also, all kinematic inversions are understood to be within the scope of protection of the present invention. Expressions such as "consisting of", when used in this description or the appended claims, should be construed not as an exhaustive enumeration, but rather in an inclusive sense of "at least consisting of". Indications such as "a" or "one" must not be construed as a limitation to just a single specimen, but have the meaning of "at least a single specimen" and do not exclude plurality. Expressions such as: "means for . . . " should be read as: "component configured for . . . " or "member constructed to . . . " and should be construed to encompass all equivalents for the structures disclosed. The use of expressions such as: "critical", "advantageous", "preferred", "desired", etc., is not intended to limit the invention. Furthermore, features that are not specifically or explicitly described or claimed in the construction according to the invention, but are within the purview of the skilled person, may also be encompassed without departing from the scope of the invention, as defined by the claims.

The invention claimed is:

1. A tag for attachment to an animal, the tag being an active tag comprising:
   a transmitter unit for generating a transmitter signal;
   a first antenna unit connected with the transmitter unit, for emitting the transmitter signal;
   an energy source for providing electrical energy to at least the transmitter unit; and a housing in which the transmitter unit, antenna unit and the energy source are included, the housing being provided with
   an attachment opening for receiving therethrough an attachment element for attachment of the active tag to the animal, wherein the first antenna unit is provided with at least one first winding which extends around the attachment opening, the antenna unit being provided with a conductive wire comprising the at least one first winding, the conductive wire on one side comprising a connection side which is connected with the transmitter unit and on the other side comprising a free end.

2. The tag according to claim 1, wherein the at least one first winding of the first antenna unit is configured to form a magnetic axis which substantially corresponds to an axial length of the attachment opening and/or to an axial length of the attachment element when the attachment element is received by the opening.

3. The tag according to claim 1, wherein the at least one first winding comprises a multiplicity of first windings which in combination form a helix.

4. The tag according to claim 3, wherein an axial length of the helix formed by the first windings substantially corresponds to an axial length of the attachment opening and/or to an axial length of the attachment element when the attachment element is received by the opening.

5. The tag according to claim 1, wherein the attachment opening is provided outside a center of gravity of the active tag.

6. The tag according to claim 1, wherein the housing comprises a substantially disc-shaped body part, the attachment opening being provided outside a center of the disc-shaped body part and being provided outside the disc-shaped body part.

7. The tag according to claim 1, wherein the active tag is further provided with a processor for generating information with which the transmitter signal is modulated by the transmitter unit, wherein the processor is included in the housing and wherein in use, the energy source provides the processor with energy for the operation of the processor.

8. The tag according to claim 7, wherein the active tag is further provided with at least one sensor system which is connected with the processor for generating at least a part of the information.

9. The tag according to claim 8, wherein the sensor system comprises at least one of a temperature sensor, heart rhythm sensor, biosensor, a GPS sensor or G sensor.

10. The tag according to claim 1, wherein the active tag is further provided with at least one receiver unit which is included in the housing and is connected with the antenna unit, wherein, in use, the energy source provides the receiver unit with energy for the operation of the receiver unit.

11. The tag according to claim 1, wherein a least diameter of the at least one winding of the first antenna unit is at most 3 times, the maximum diameter of the attachment opening.

12. The tag according to claim 1, wherein the active tag is further provided with the attachment element, wherein the attachment element is provided with a pin which, in use, extends through the attachment opening, wherein the pin comprises a rigid part which is made of metal and/or glass-filled plastic.

13. The tag according to claim 12, wherein the pin is in the form of an arrow-shaped rod, wherein the arrow-shaped rod comprises an arrow head and an arrow body, wherein the axial length of the arrow body is approximately equal to the axial length of the attachment opening.

14. The tag according to claim 13, wherein the attachment element comprises a base, wherein the pin extends from the base in a direction directed away from the base, wherein, in use, the base and an outer surface of the housing form opposite clamp surfaces for clamping there between a part of the body of the animal.

15. The tag according to claim 1, wherein the first antenna unit is configured to emit the transmitter signal at a frequency which is less than 2.5 GHz.

16. The tag according to claim 1, wherein the first antenna unit is configured to irradiate at least one receiver with the transmitter signal for determining the position of the active tag with the aid of the at least one receiver.

17. The tag according to claim 1, wherein the transmitter signal contains information about the identification of the active tag.

18. The tag according to claim 1, wherein the housing is made substantially of a plastic.

19. The tag according to claim 1, wherein the energy source comprises at least one of a battery and a resonant circuit.

* * * * *